United States Patent [19]

Rademacher

[11] Patent Number: 5,051,059
[45] Date of Patent: Sep. 24, 1991

[54] FLUID POWERED ELECTRIC GENERATOR HAVING HINGED VANE ROTOR

[76] Inventor: T. Peter Rademacher, 5385 River Styx Rd., Medina, Ohio 44256

[21] Appl. No.: 421,350

[22] Filed: Oct. 13, 1989

[51] Int. Cl.$^5$ ............................................. B63H 1/34
[52] U.S. Cl. ........................................ 415/7; 415/3.1; 416/85; 416/140
[58] Field of Search ............... 415/3.1, 4.3, 4.5, 2.1, 415/906, 905, 908, 7; 416/85, 86, 140, 197 A

[56] References Cited

U.S. PATENT DOCUMENTS

| | | | |
|---|---|---|---|
| 100,761 | 3/1870 | Heitmann | 415/7 |
| 113,284 | 4/1871 | Folsom | 416/119 |
| 115,660 | 6/1871 | Tuder | 415/141 |
| 302,769 | 7/1884 | Pallausch | 415/7 |
| 774,592 | 11/1904 | Mathews | 416/119 |
| 1,037,260 | 9/1912 | Johnston | 416/119 |
| 1,109,839 | 9/1914 | Henry | 415/7 |
| 1,265,114 | 5/1918 | Riddle | 416/197 A |
| 1,494,528 | 5/1924 | Clanton et al. | 415/7 |
| 4,383,797 | 5/1983 | Lee | 415/7 |

FOREIGN PATENT DOCUMENTS

| | | | |
|---|---|---|---|
| 102791 | 9/1898 | Fed. Rep. of Germany | 416/119 |
| 40240 | 3/1980 | Japan | 415/3.1 |
| 1452483 | 10/1976 | United Kingdom | 416/197 A |

Primary Examiner—John T. Kwon

[57] ABSTRACT

A hinged vane rotor generating power from rivers, streams, tides or wind. A cylindrical drum is supported sideways in a current by axles at the ends connected to pulleys which are in turn, connected to a generator(s), mill wheel, pump or other working device. The rotor is turned by a series of hinged vanes, each one opening to catch the current on one side of the drum and closing to avoid the current on the other side of the drum. A fluid directing component is incorporated to increase current against one side of the drum and reduce it against the other side.

8 Claims, 7 Drawing Sheets

FLUID POWERED ELECTRIC GENERATOR HAVING HINGED VANE ROTOR

TECHNICAL FILED

The invention herein resides in the art of fluid powered electric generator having a hinged vane rotor, and more the particularly, the rotor is spun on an axis perpendicular to fluid current, and where the vanes open and close as they rotate through the power stroke.

BACKGROUND ART

Rotors powered by flowing current consist generally of two types, those with axis of rotation parallel to the current and those with axis of rotation perpendicular to it. Rotational energy is supplied around a central shaft (axis of rotation) in both types of a series of identical vanes radially extending from the shaft at uniform intervals around the circumference.

An airplane propeller is a rotor of the first type, having its rotational axis parallel to the current. the vanes of this type of rotor are angled (pitched) on their radial axis relative to the axis of rotation to provide rotational thrust.

Current force vectors applicable to a particular point on a given vane are generally constant throughout their circular revolution of the shaft. Nearly identical force vectors affect corresponding points on the other vanes.

These types of rotors have been equipped with variable pitch vanes as shown in U.S. Pat. No. 400,209 wherein the pitch of all vanes against the current can be adjusted to optimize performance at different rotational speeds and the like. The vanes of such rotors can be curved as in a spiral to better capture fluid flow while imparting rotational effect and the spiral can even be made continuous around the length of the shaft as shown in U.S. Pat. No. 1,071,748.

Rotors axially oriented with the current have a continuous power cycle imparted by one side only of the vanes.

The other main type of rotor, i.e. one axially oriented against the current, has a two-part cycle effected by each vane, a power stroke and a return. The series of identical vanes are mounted parallel to the rotational axis and are perpendicular to the current with one side at the mid-point of the power stroke and with the other side at the mid-point of the return stroke. These paddle wheel type rotors have traditionally been oriented in supporting structures such that a current stream impinges only a portion (less than half) of the rotor to drive it as in the general use of paddle wheels having a lower portion in a water current and the upper portion held in the air above the water surface. This method is shown by the tidal motor of U.S. Pat. No. 700,408 and the wave motor of U.S. Pat. No. 1,289,533.

Various means are shown in the art for directing or channelling current against rotors or portions thereof. U.S. Pat. No. 757,909 shows a portable spillway and U.S. Pat. No. 946,104 shows a portable chute having such purpose.

The art of mounting rotors on floating platforms to generate electrical power from river current is known as shown in U.S. Pat. No. 1,147,658.

Prior art does not disclose hinged or flappable vanes for application with cross-current rotors whereby the vanes are automatically extended in their power stroke by current against one side to receive maximum current force against that side during power cycle and retracted by current force against the other side during the return cycle to receive a reduced current force against that side. Such hinged vane rotors can fill a need for improvement in cross current rotor technology and should be useful in filling many needs for such rotors, particularly for low cost, easily erected hydroelectric generating facilities.

DISCLOSURE OF THE INVENTION

The general object of the invention is to provide an improved rotor impelled by fluid currents to rotate on a central axis at right angle to the current flow.

Another object of the invention is to provide such a rotor having a series of vanes pivotal on hinge lines perpendicular to current flow by such flow to present a broad side of a vane against the current during power stroke and a narrow side during return.

Another object of the invention is to provide a fluid current rotor easily and inexpensively constructed without need of dams, spillways or other alteration of the ecology of a river, its banks or surroundings.

Another object of the invention is to provide power generation by such a rotor at locations on rivers or streams or at tidal flow areas without disruption of river navigation.

Yet another object of the invention is to provide a rotor that can operate across a current while completely immersed in the current stream, so as to obtain more power from the flowing current.

BRIEF DESCRIPTION OF THE DRAWINGS

In the drawings illustrating the preferred embodiment of the invention, synonymous reference numerals are employed throughout the various views to refer to identical components.

FIG. 3 is an elevational view showing partially cutaway grillwork on the upstream end of the structure of the invention;

DESCRIPTION OF THE PREFERRED EMBODIMENT

Figure 1:
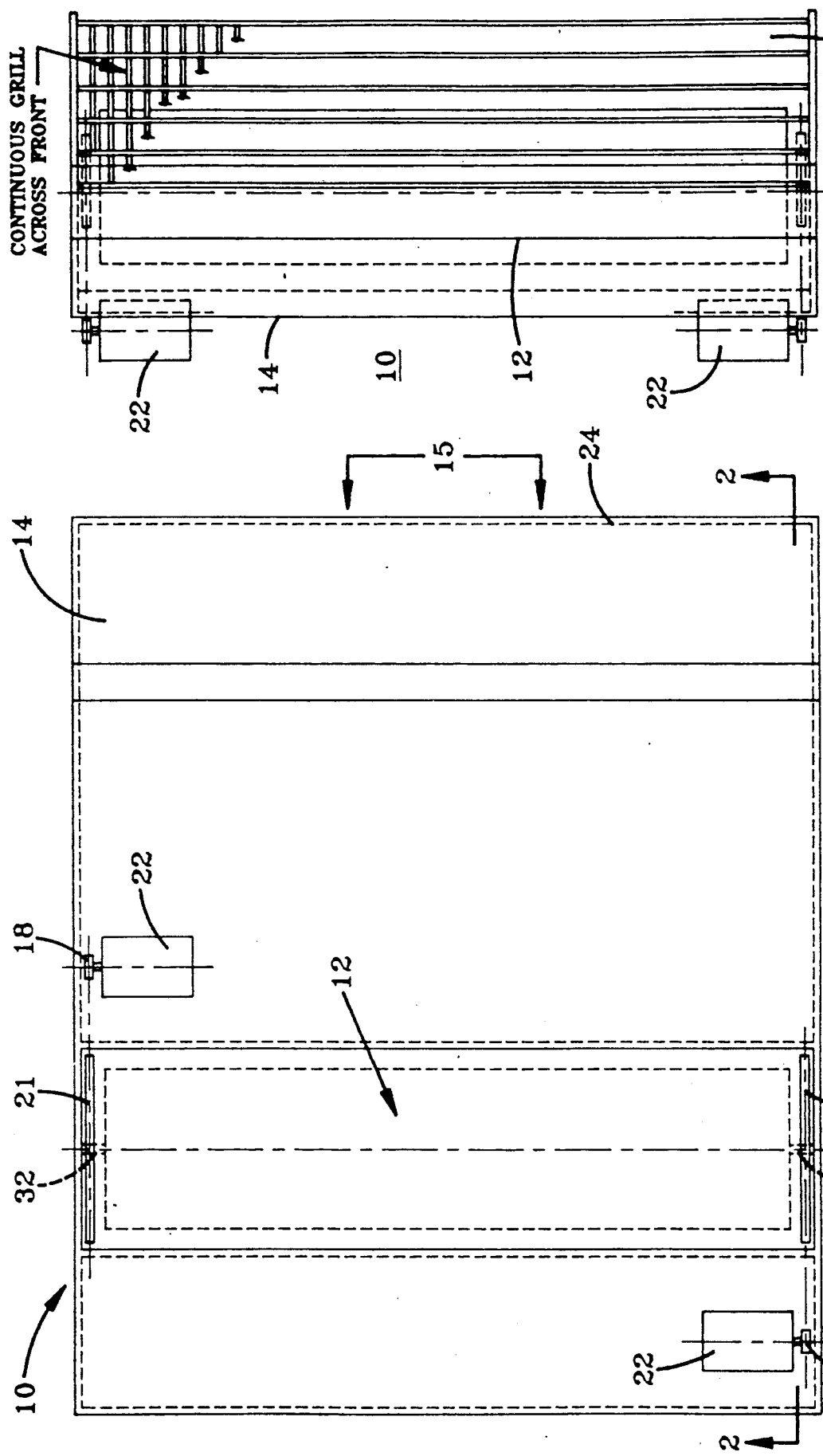
FIG. 1 of the drawings illustrates a top view plan of the invention showing the flow of a current stream and showing the hinged vane rotor transversely mounted under the down-stream end of the structure of the invention.

Referring specifically to FIG. 1 of the drawings, the reference 10 generally designates a barge mounted current rotor device of the present invention which comprises a hinged vane rotor 12 transversely mounted to the underside of a barge 14. The barge is anchored in a stream or river with the rotor 12 perpendicular to the current flow shown generally by arrows 15. One or more electric generators 22 are mounted to the top of the barge 14. Pulleys 18 at the end of each electric generator are connected by belts 20 to pulleys 21 at each end of the hinged vane rotor 12 as shown in greater detail in FIG. 2 of the drawings.

Figure 2:
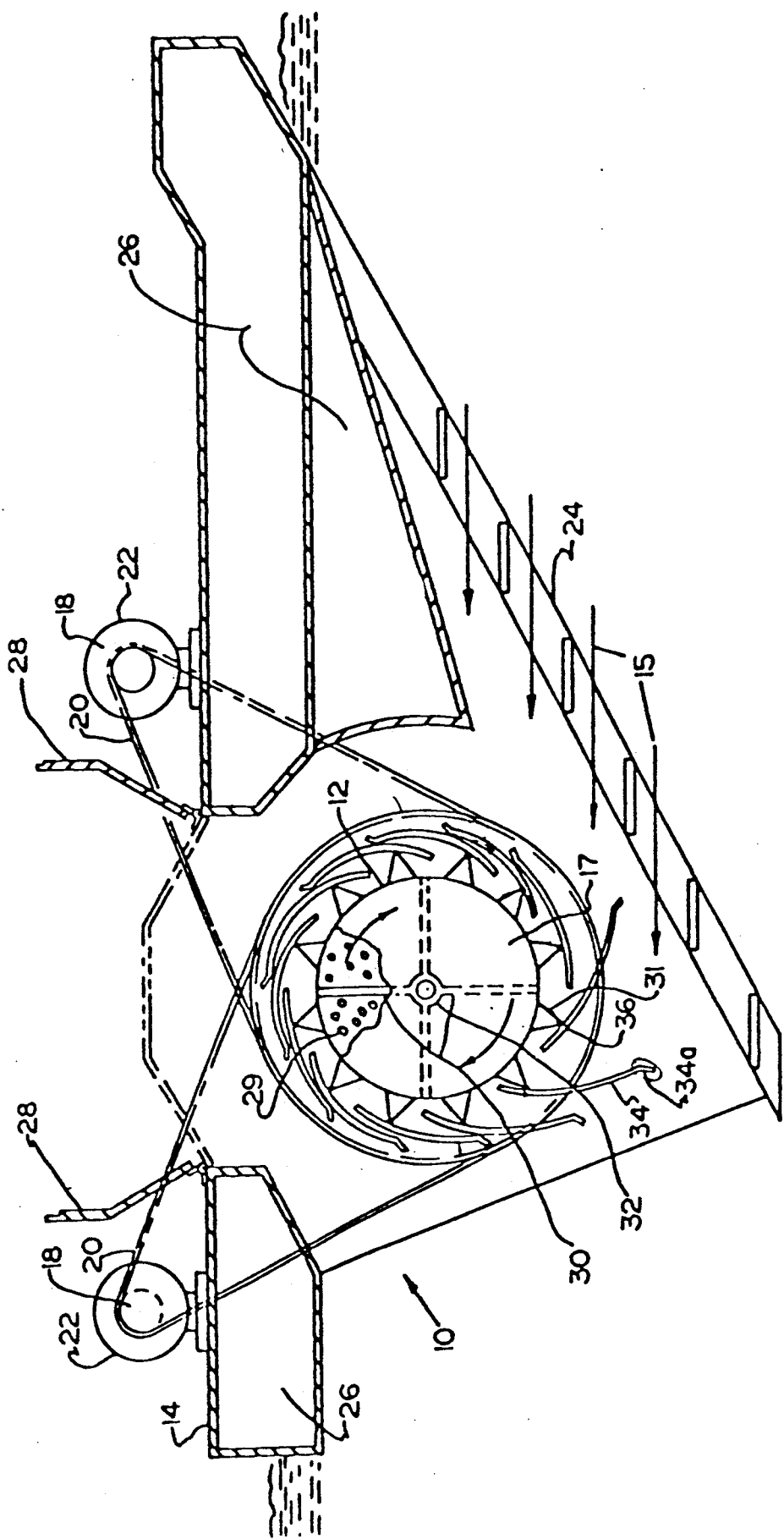
FIG. 2 is a vertical cross-sectional view taken along line 2—2 of FIG. 1 showing the structure details of the hinged-vane rotor.

Referring to FIG. 2, the hinged vane rotor 12 is made up of a cylindrical drum 17 having pivot supports 31 thereon and hinged vanes 34 pivotally secured to the pivot supports 31. The rotor may vary in size both as to diameter and length depending upon the consumer's specifications and the particular application to which it is to be applied. Typically, with a six foot diameter rotor, it is contemplated that there will be twelve vanes each approximately three feet wide by whatever the length of the rotor.

Vanes are curved to add great strength to relatively thin materials and are formed on both edges to add the position stop and also on the other edge to allow water to quickly penetrate and open the vane to enter into its extended-power position.

A larger diameter rotor may call for additional 3 foot vanes to retain a similar overlap relative one to another or larger vanes as current and water depth allow.

The rotor is constructed to be able to achieve a flywheel type action by dividing the interior into a plurality of separate compartment by having a criss-cross baffle arrangement 30. Some holes 29 are provided on the ends of the rotor to allow water to enter into the four baffled compartments, thus allowing the rotor to essentially be completely filled with water, and causing each separate compartment to carry its respective water as the rotor is driven as defined hereinafter, thus causing the ballast water within the separate compartments to create a flywheel effect on the rotation of the rotor.

The rotor includes a pair of centrally and axially aligned external axle 32 with the axle 32 adapted to be rotatably supported in the sides of the barge 10 in a suitable manner by a bearing or the like and preferably by simply dropping vertically by gravity to be held in place as shown in a fully submerged relation to the fluid flow.

The rotor is adapted to sink into the water and have no buoyancy. A single or plurality of the rotors will be supported by axle 32 to the barge 10 in end-to-end relationships up to a desired width, say for example 30 to 100 feet, depending upon the width of the stream or the dam or the tidal area in which the unit would be positioned for electric generation action.

An important aspect of the invention is to achieve the pivoting center of the vanes 34 which are pivotally affixed to the pivot supports 31. The pivot supports 31 may be of any adequate structural configuration, but as shown in FIG. 2 as being triangularly shaped and attached at the base of the triangle to the surface of the rotor. The vanes are of a curved type design with one long leg and the other a short leg, wherein the long leg overlaps the preceding vane around the rotor circumference. The overlapping allows for a much larger surface area for catching the water or fluid as the vane pivots into its operative position with each vane being forced open as it enters the fluid flow in the actuating direction by a small feathered leading edge 34a which directs the fluid as it moves into the operative position and thus moves the vane in a smooth movement to its operative position because there is some resistance against the fluid on the end away from the feathered end as it acts against the fluid.

As the vane comes open in the actual stream area to receive water, the long leg portion of the vane is moved into the actuating position allowing the vane to pick up and transfer the energy from the flowing water or fluid stream into the rotor, with the rotor thus transferring that power appropriately into an electric generator by the turning of the belts 20 from a large pulley 32 on each end of the rotor to small pulleys 18 at the generators 22. The short leg of the vane enables the long leg of the vane to open to its maximum power point and then the short leg abuts against the pivot support thus stopping the movement of the vane and positioning the vane to pick up the maximum energy from the water stream. Rubber cushions may be used on the short legs or at the abutment points on the drum to act as shock absorbers as well as adjustments for amount of vane opening. The vane continues to pick up energy from the stream until it is out of the water stream area and thus starts to come back down upon the preceding vane and continue the pattern around the drum with another vane opening thus having a continuous pattern of opening and closing vanes allowing the drum to pick up the maximum of energy from the water or fluid stream. The folding of the vanes as they move out of the fluid stream thus makes them effectively frictionless as they move in the direction opposite to the actuating direction of the fluid stream, thus giving the best possible energy transfer from the energy in the stream to the hinge van rotor. The curved long leg of the vane when open in conjunction with the pivot and the pulleys on each end of the rotor forms a pocket from which the driving force of the water cannot escape until it has revolved to the unloading closed vane position.

In this particular embodiment the rotor is serviceable through access doors 28. Access area is covered for heating in winter to avert ice forming on pulleys and for service and to prevent ice forming on the vane hinges. The barge is equipped with flotation chambers 26 which may be sealed to hold air or may be filled with a flotation material such as styrofoam. The upstream end of the barge may be equipped with a continuous grille 24 shown partially cut away in FIG. 3. However, it has been found that a grille may not be necessary because any objects floating in the river will generally be moving at the same speed as the water and the rotating rotor so that it will readily pass through the vanes without any damage.

The upstream end of the barge is also wedge shaped in cross-section to direct flowing water downward at a somewhat increased velocity onto the lower half of the rotor to provide added rotational thrust and greater torque. In other words water to the full diameter of the rotor is condensed into power only on one half of the rotor by the downward direction and the rotor being fully submerged.

Figure 4:
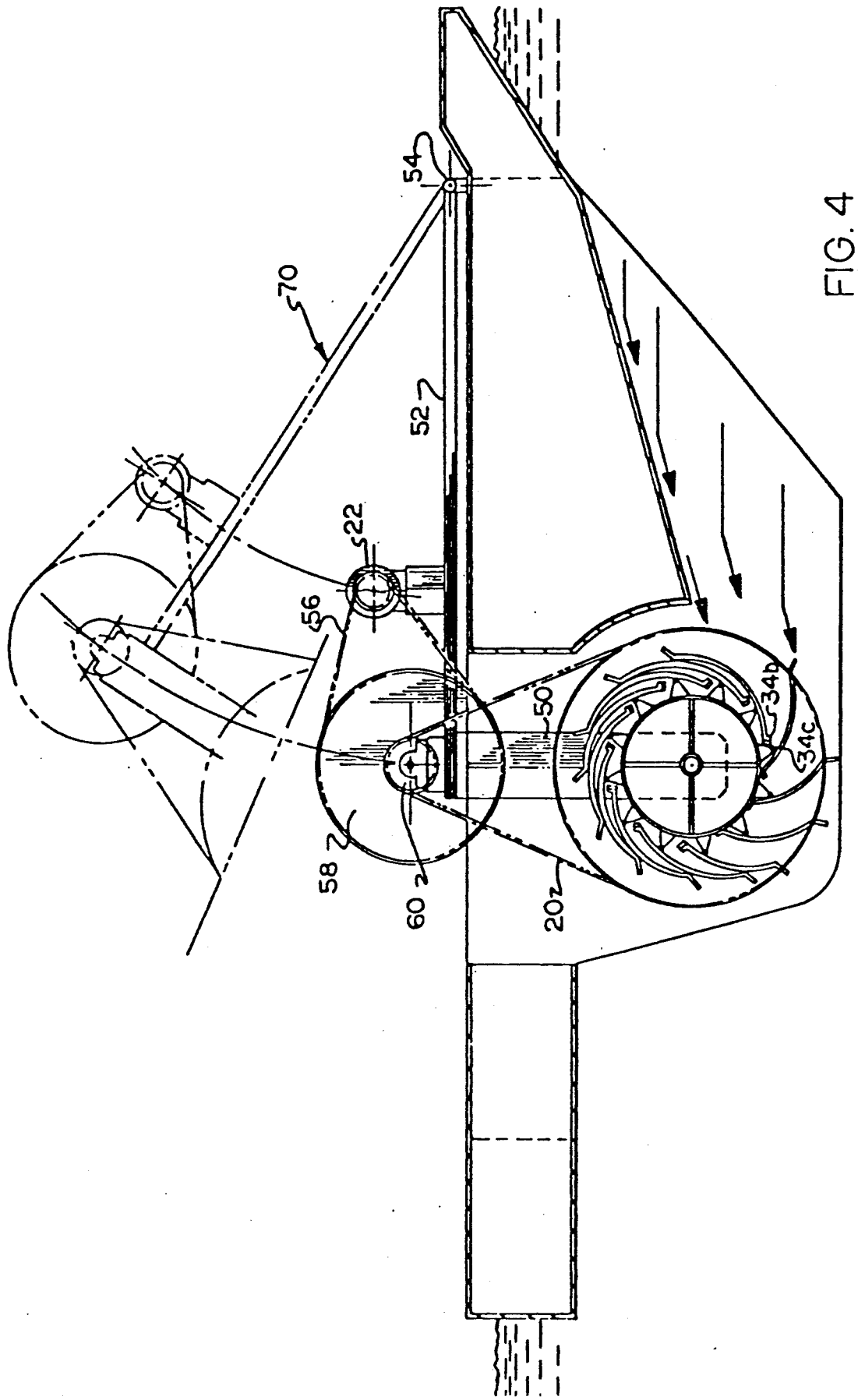
FIG. 4 is a vertical cross-sectional view of a modified barge structure similar to FIG. 2 but with the rotor structure similar to a hinged support structure to make for easier access to the rotor from the barge surface.

Referring now particularly to FIG. 4 of the drawings the same numerals are utilized to indicate the same components. The basic difference with this modification is the vanes 34 include a tab stop 34b with some type of resilient material 34c to facilitate the stopping action of each respective vane. The rotor is supported from each end by a support post 50 carried by a rotor platform 52 which is pivotally mounted at 54 towards the front of the barge 10. The generator 22 is connected through a belt 56 to an interim pulley 58 which interconnects through pulley 60 and belt 20 to pulley 21, similarly to that shown in FIG. 2, but wherein the rotor 12 is not directly connected by belts to the generator. Sizing of pulleys and bolts determine optimum rpm and torque values.

This arrangement of FIG. 4 allows for a simple block and tackle arrangement or some type of hydraulic ram for example (not shown) to allow a simple pivoting of the entire rotor generator unit up to the chain dotted line maintenance position shown generally by numeral 70 for servicing and attention to repairs. This embodiment also does not utilize a protective grillwork but merely the downward sloped forward portion of the barge to direct the surface water down to its active inner engagement with the unfolding vanes as they drop into the active flowing stream to achieve the actuated position. This adjustment means for the rotor up and down in the current stream allows adjustment in different currents to an optimum efficiency point.

Figure 5:
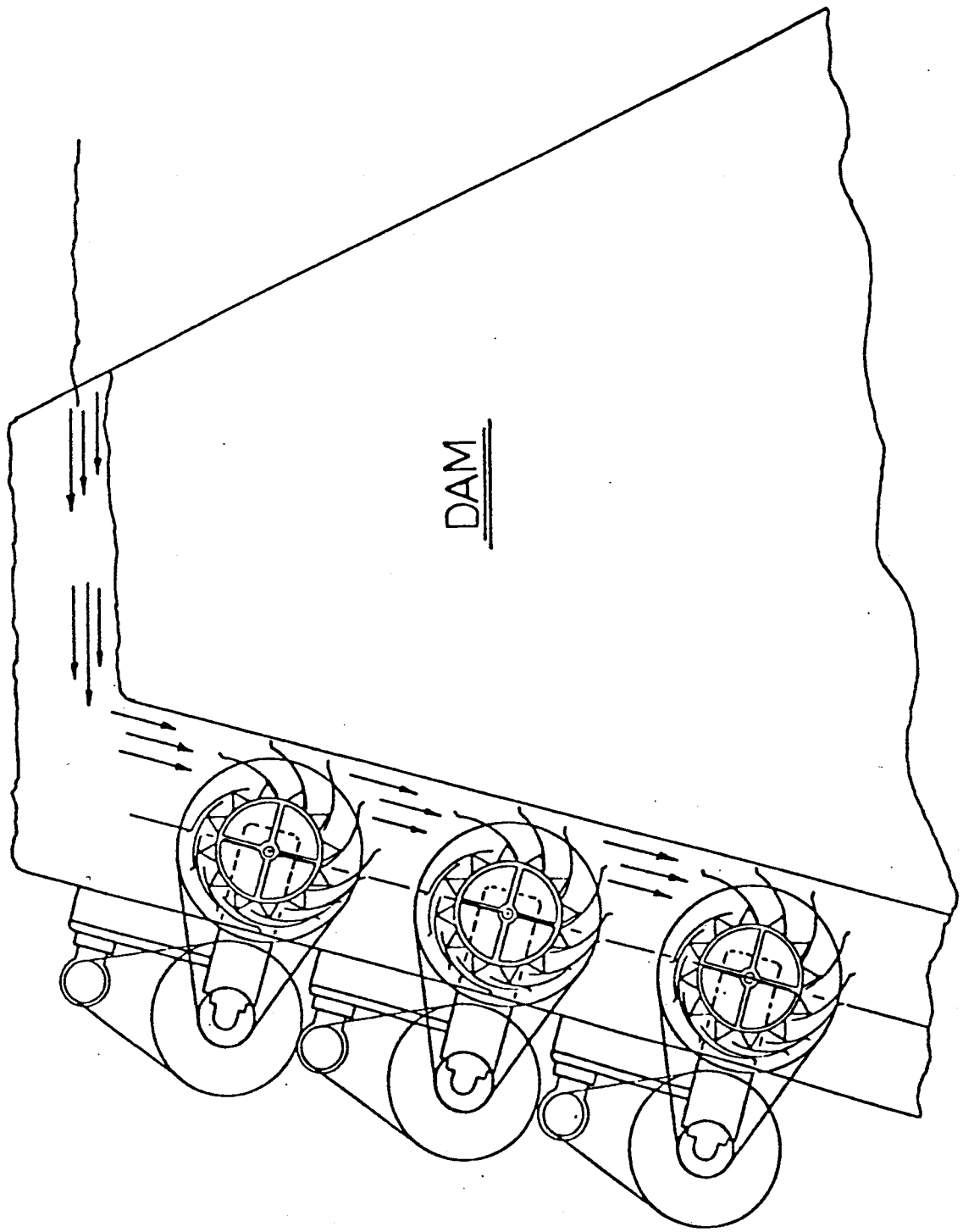
FIG. 5 is a side elevational view of a multiple stacked modification which could be applicable to a spillway or the like and FIG. 6 is a side elevational view of a modified structure of the rotor and support arrangement adapted for a tidal flow without changing the direction of the structure itself.

FIG. 5 depicts a multiple stacked arrangement of units which might be positioned on a spillway of a dam or the like, and in the stacked arrangement, of course the same volume of water acts on three rotors as shown in FIG. 5. This structure of the rotor and support mechanism attaching to the generator is similar to that shown in FIG. 4. It is believed that this structure can be readily incorporated into the construction of the dam or spillway or added to the existing dam or spillway by simple support mechanism on the sides to support the basic platform to carry the rotor/generator combination. Any number of rotors could be used in such combination.

Figure 6:
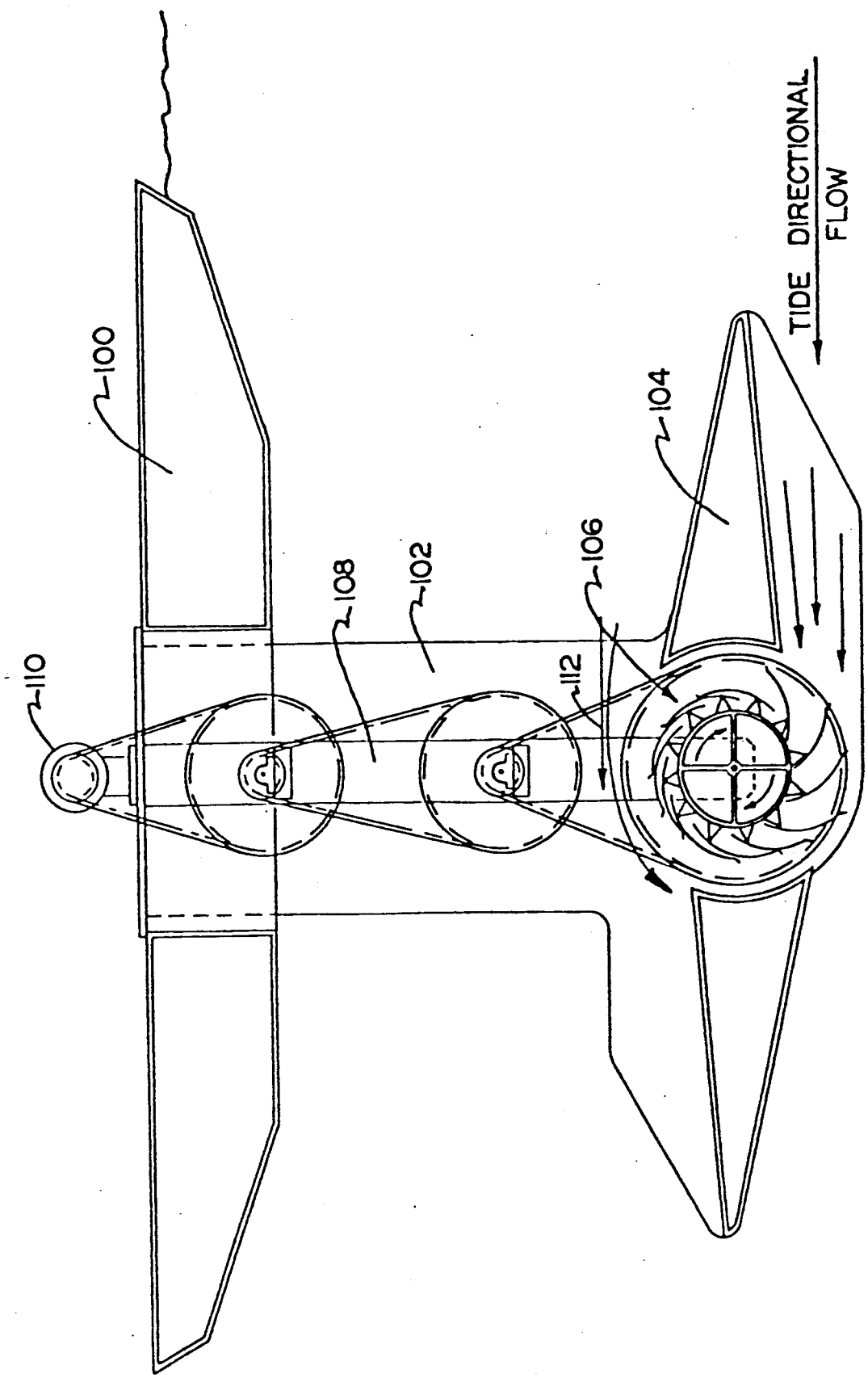
Figure 7:
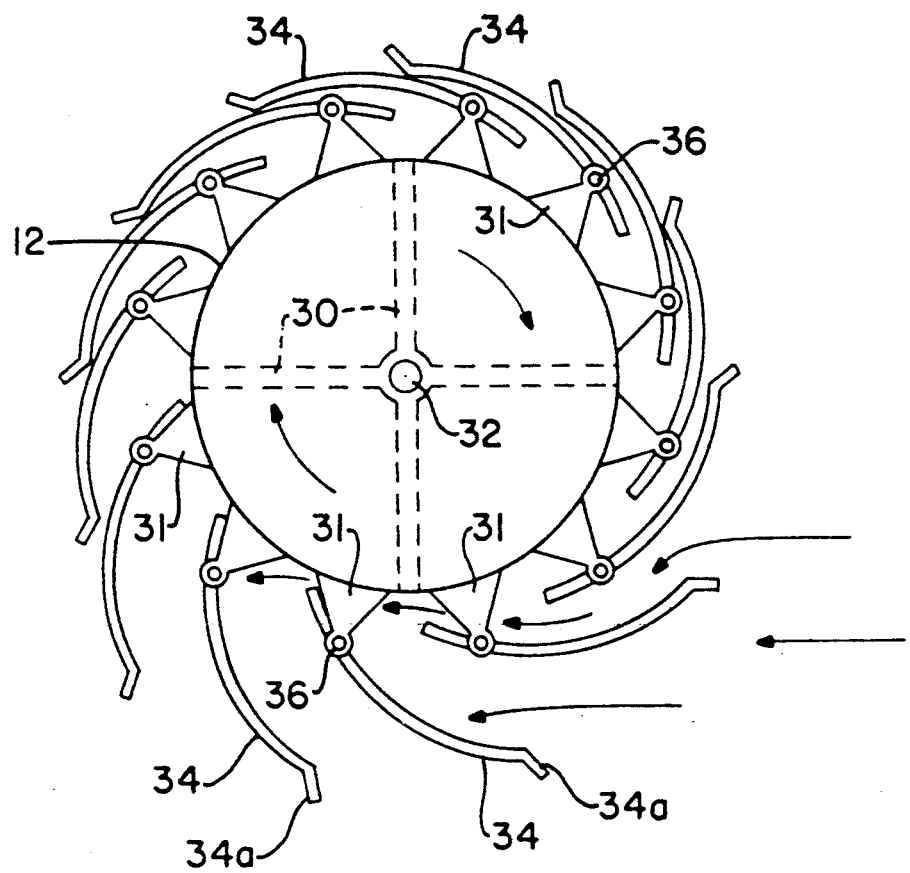
FIG 7 is a side view of the invention showing the flow of a current stream.
Figure 8:
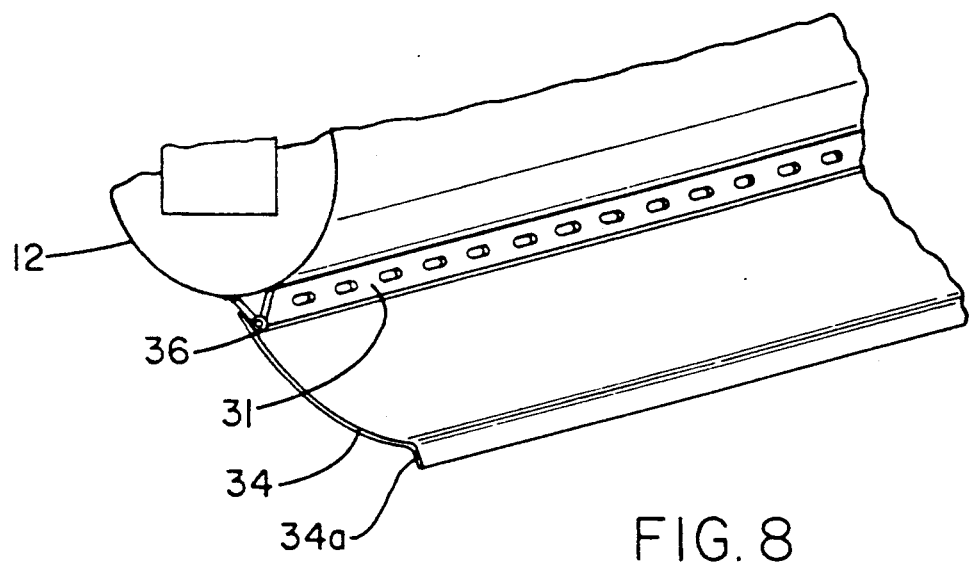
FIG 8 is a perspective view of a drum with the openings on a pivotal mounting.

FIG. 6 illustrates a modification for an ocean tide application through a narrow channel for example where the basic barge is floated at the surface indicated by numeral 100 with a downward projection portion 102 for supporting the lower fairing 104 into which the basic rotor, indicated generally by arrow 106, is mounted. A central support beam 108 acts to support the rotor 106 in the same manner as described with respect to FIG. 4 and goes through a plurality of pulleys and belts to a generator 110 that is mounted on the barge 100. Here the fairing 104 is configured to flair the flowing tide over the top of the rotor from the right side of FIG. 6 and over the bottom side of the rotor from the left side. The arrows indicated in the drawing depict the tidal direction flow from right to left causing actuation of the rotor vanes as shown and with the laminar flow of the tidal currents flowing over the top of the rotor is particularly depicted by arrows 112. Naturally, when the tide flow direction shifts, the rotor will continue to rotate in the same direction, but the water flow will be in the opposite direction.

One of the features of the invention is that the vanes open slowly and without any slamming into position, thus reducing stress and strain on the structural components, leading to a quiet operation, and one which is going to be failure free. Essentially, in order to understand how this occurs, it must be understood that the entire unit is essentially at least one-half submerged in the water so that the water pressure actually tends to hold the vanes in a closed position until the water pressure catches under the small tips 34a and starts the vane into the opening position as best seen in FIG. 2. However, water also flows through the opening on the pivot supports 31 causing water pressure on the tail end of the vane which tends to counter the pressure on the larger opening face, and eliminates slamming or banging or high pressure bumping of the vanes in their full open condition, as they move with a cushioned relationship up against the back side of the pivot supports 31. Hence, it should be understood that the shorter portion of the pivotal mounted vane thus causes the fluid to act on it in a counterbalancing relationship so as to cushion the movement of each vane into its operative position.

While in accordance with the patent statutes only the preferred embodiment of the invention has been illustrated and described as set forth above, plus particular modifications and adaptations associated therewith, it is to be understood that the invention is not to be deemed limited thereto or thereby, but that the inventive scope is defined in the appended claims.

What is claimed is:

1. An improved fluid activated, hinged vane rotor which comprises:
    a support means adapted to be positioned in a fluid stream, and including a fairing having smooth configuration to direct the fluid stream in connection therewith, which is characterized by:
    a hinged vane current rotor carried by the support means and positioned in the fluid stream which consists of
    a cylindrically shaped drum means to rotatably support the rotor at each end in the support means, on a rotational axis substantially perpendicular to the fluid stream, said drum means being capable of filling with water,
    a plurality of overlapping vanes pivotally mounted to the drum wherein the pivotal mounting of the vanes is spaced from the outer surface of the drum so as to permit the flow of fluid, through the opening on said pivotal mounting and at a point on the vane defining a first and second leg of each vane, said first leg being movable from its folded overlapped relationship essentially parallel to the surface of the rotor into an open position relative to the surface of the rotor by said fluid stream, and said second leg simultaneously being movable in a direction opposite to that of said first leg and
    a means to limit the pivotal relationship of each respective vane wherein the fluid acts in a counterbalancing relationship on the second leg of the vane from the pivotal mount so as to cushion the movement of each vane to its operative position,
    and wherein the fluid stream is directed by the support means towards only about one half of the rotor, and
    an electric generator and
    a means to transmit the rotational energy from the rotor to the electric generator.

2. A fluid activated, hinged vane rotor according to claim 1 wherein the vanes are curved to be essentially concentric with the rotor in their folded relationship.

3. A fluid activated, hinged vane rotor according to claim 2 wherein the vanes have a slight upwardly curved leading edge to facilitate their opening when the fluid stream is directed thereagainst.

4. A fluid activated, hinge vane rotor according to claim 3 wherein the means to limit the pivotal movement of the vanes is achieved by the trailing edge of the vane contacting the means for pivotally supporting the vanes relative to the rotor.

5. A fluid activated, hinged vane rotor according to claim 1 wherein said means to limit the pivotal relationship of each vane is achieved by a trailing edge of said second leg of said vane contacting the rotor.

6. A fluid activated, hinged vane rotor according to claim 1 wherein the support means further comprises at least one grill work through which the fluid stream passes prior to contacting the rotor.

7. A fluid activated, hinged vane rotor according to claim 1 wherein the support means further comprises a means for adjusting the position of said rotor relative to said fluid stream.

8. A fluid activated, hinged vane rotor according to claim 1 wherein said rotor is fully submersed in said fluid and said support means further comprises a second fairing having a smooth configuration to direct the fluid stream in connection to said rotor in a second direction.

* * * * *